United States Patent
Barone et al.

(10) Patent No.: US 7,628,836 B2
(45) Date of Patent: Dec. 8, 2009

(54) ROTARY DRUM SEPARATOR SYSTEM

(75) Inventors: Michael R. Barone, Amston, CT (US);
Karen Murdoch, Somers, CT (US);
Timothy D. Scull, Riverton, CT (US);
James H. Fort, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 559 days.

(21) Appl. No.: 11/429,859

(22) Filed: May 8, 2006

(65) Prior Publication Data

US 2007/0256398 A1  Nov. 8, 2007

(51) Int. Cl.
*B01D 46/18* (2006.01)
(52) U.S. Cl. ............................... 55/406; 55/405; 55/408; 55/409; 95/31; 95/34; 95/35; 95/270
(58) Field of Classification Search .................... 55/400, 55/405–406, 408–409; 95/31, 34–35, 270
See application file for complete search history.

(56) References Cited

U.S. PATENT DOCUMENTS 5,244,479 A  9/1993 Dean, II et al.
5,693,125 A  12/1997 Dean
2003/0000184 A1  1/2003 Dean

FOREIGN PATENT DOCUMENTS

GB  1531700  11/1978

OTHER PUBLICATIONS

Extended Search Report EP07250968.

*Primary Examiner*—Robert J Hill, Jr.
*Assistant Examiner*—Dung Bui
(74) *Attorney, Agent, or Firm*—Carlson, Gaskey & Olds, PC

(57) ABSTRACT

A rotary phase separator system generally includes a step-shaped rotary drum separator (RDS) and a motor assembly. The aspect ratio of the stepped drum minimizes power for both the accumulating and pumping functions. The accumulator section of the RDS has a relatively small diameter to minimize power losses within an axial length to define significant volume for accumulation. The pumping section of the RDS has a larger diameter to increase pumping head but has a shorter axial length to minimize power losses. The motor assembly drives the RDS at a low speed for separating and accumulating and a higher speed for pumping.

14 Claims, 8 Drawing Sheets

ROTARY DRUM SEPARATOR SYSTEM

This invention was made with government support under Contract No.: NSA898053 awarded by NASA. The government therefore has certain rights in this invention.

BACKGROUND OF THE INVENTION

The present invention relates to a two-phase separator, and more particularly to two-phase separation, accumulation, and pumping that maximizes accumulating and pumping ability while minimizing power consumption.

Because of re-supply constraint in long duration missions, such as space missions, minimizing mass, volume and power are essential. Closed Advanced Life Support Systems (ALS), including Air Revitalization Subsystem, Water Revitalization Subsystem, etc., are desirable. In a typical Advanced Air Revitalization System, water is electrolyzed into oxygen (O2) and hydrogen (H2) in an oxygen generation subsystem. Water is also consumed in various hygiene needs, physiological loads and other life support functions. A typical Water Recovery System (WRS) will regenerate water from various wastewater streams.

One WRS system is a Sabatier System which is designed to recover water and does so via a reaction that produces water vapor mixed with gases (primarily methane and $CO_2$). CO2 reacts with H2 and generates water and methane according to the following Sabatier reaction:

$$CO2+4H2 \rightarrow 2H2O+CH4$$

The Sabatier system accomplishes this by utilizing hydrogen, carbon dioxide, and waste products from the life support system to produce water and methane.

The catalytic methanation reaction between CO2 and H2 is exothermic and self-sustainable. Water vapor generated from the Sabatier reactor can be recovered by passing the product gases through a condenser in which the water is condensed, yielding a two-phase flow (water in mostly gas stream). The recovered water is then recycled back into the life support system to provide oxygen; while the methane can be used for propulsion, or can be broken down further to recover the hydrogen. This technology is applicable not only to transit phases of exploration, but surface habitats as well as in-situ propellant production.

Accordingly, it is desirable to provide a compact and lightweight two-phase separator system which separates water from gas, accumulate the water, and pumps the water at higher pressure for downstream processing and use while minimizing power consumption.

SUMMARY OF THE INVENTION

The rotary phase separator system according to the present invention generally includes a rotary drum separator (RDS) and a motor assembly. The motor assembly drives a rotating assembly of the RDS in response to a controller which drives the RDS at two operation speeds. A low speed is used for separating and accumulating water from gas. A higher speed is used for pumping the water once the accumulator is full.

In operation, the two-phase flow (water in mostly gas stream) in input into an impeller shaft section of a hollow shaft through a two-phase inlet tap. The two-phase flow is centrifugally flung to the outer diameter of the impeller shaft section that moves the water radially outward while allowing the gas to communicate and collect within a central shaft section along an axis of rotation. The primary separating impeller provides ample flow area for the gas while maintaining small clearances to the central shaft section and thence to a gas outlet tube. A secondary separating impeller mounted within the hollow shaft facilitates separation capability and robustness to further minimize liquid (if present) injection into an inlet of the gas outlet tube.

The accumulating function is effectuated inside an accumulator section and an impeller pump section that form an annulus around the center hollow shaft. The water rotates at essentially shaft speed since it is fully enclosed by the accumulator section and the impeller pump section and has virtually no exposure to stationary walls. The "full" level of the accumulators is at the hollow shaft OD. The "empty" level of the accumulator section is at the accumulator OD. The smooth outside walls of the drums minimize power losses. A minimized diameter to length ratio also minimizes power losses. As the accumulator section and the impeller pump section fill with liquid, the gases therein are forced radially inward back into the hollow shaft toward the axis of rotation and through the shaft gas communication apertures and thence into the inlet of the gas outlet tube.

The pumping function is accomplished by the impeller pump section which is facilitated by the internal vanes between the impeller disks. Once the accumulation section is "full" the liquid is pumped through the tangential outlet located at the maximum diameter of the device to maximize both static and dynamic head.

The RDS operates on a two-speed schedule. At low speed, about 1000 rpm, the RDS creates enough of an artificial gravity field to effectively separate the gas and liquid phases. The gas port is always open when the Sabatier is in process mode generating water; therefore the vent gases flow through the RDS with very little pressure drop. Once the liquid level of the separator reaches the high end of the operating range ("full"), the controller increases the speed of the RDS to about 2000 rpm. At this speed, the pressure generated by the centrifugal and velocity forces of the liquid in the impeller shaft section of the rotating assembly is sufficient to overcome the system backpressure and the liquid empties from the RDS. The high speed condition is maintained for a sufficient length of time such that the liquid level drops to the low end of the operating range ("empty").

The present invention therefore provides a compact and lightweight two-phase separator system which separates water from gas, accumulate the water, and pumps the water at higher pressure for downstream processing and use while minimizing power consumption.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general schematic view of an Sabatier Reduction system for use with the present invention;

FIG. 2 is a perspective view of a rotational assembly for a rotary drum separator of the present invention;

FIG. 3A is a perspective view of a rotary drum separator of the present invention;

FIG. 3B is a sectional view of the rotational assembly taken along line 3B-3B in FIG. 3A;

FIG. 3C is a sectional view of the rotational assembly taken along line 3C-3C in FIG. 3A;

FIG. 3D is a sectional view of the rotational assembly taken along line 3D-3D in FIG. 3A;

DETAILED DESCRIPTION OF THE PREFERRED EMBODIMENT

Figure 1:
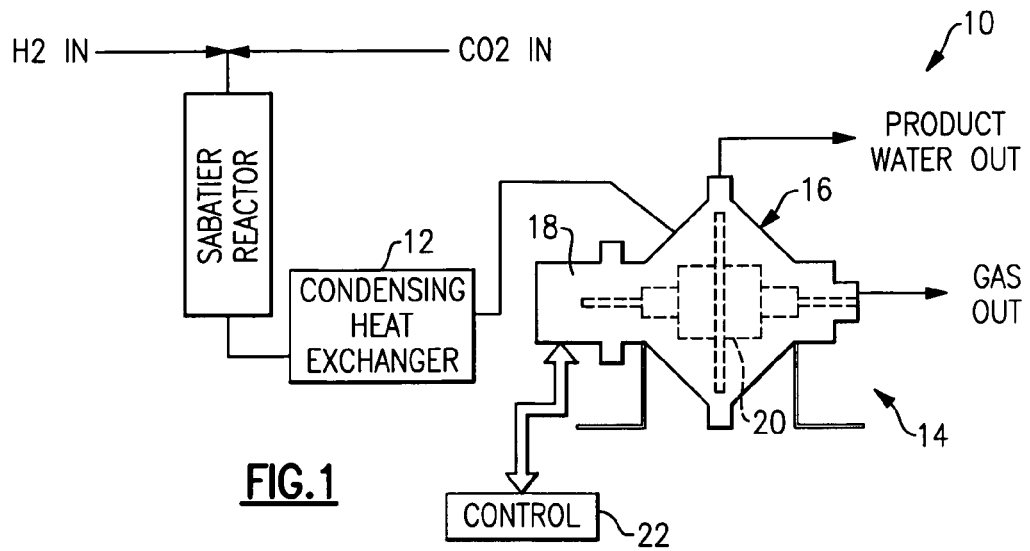

FIG. 1 illustrates a general perspective view of a Sabatier Reduction system 10 which receives the hydrogen by-product from electrolytic oxygen generation and metabolic carbon dioxide that is concentrated by a molecular sieve bed and reacts them to form methane and water. The reactor products are cooled in a heat exchanger 12 where the water product condenses to liquid. The liquid water and methane gas are then separated in a rotary phase separator system 14, with the water being delivered to the water bus and the methane released out the vacuum vent duct. Potable water is thereby provided.

Figure 2:
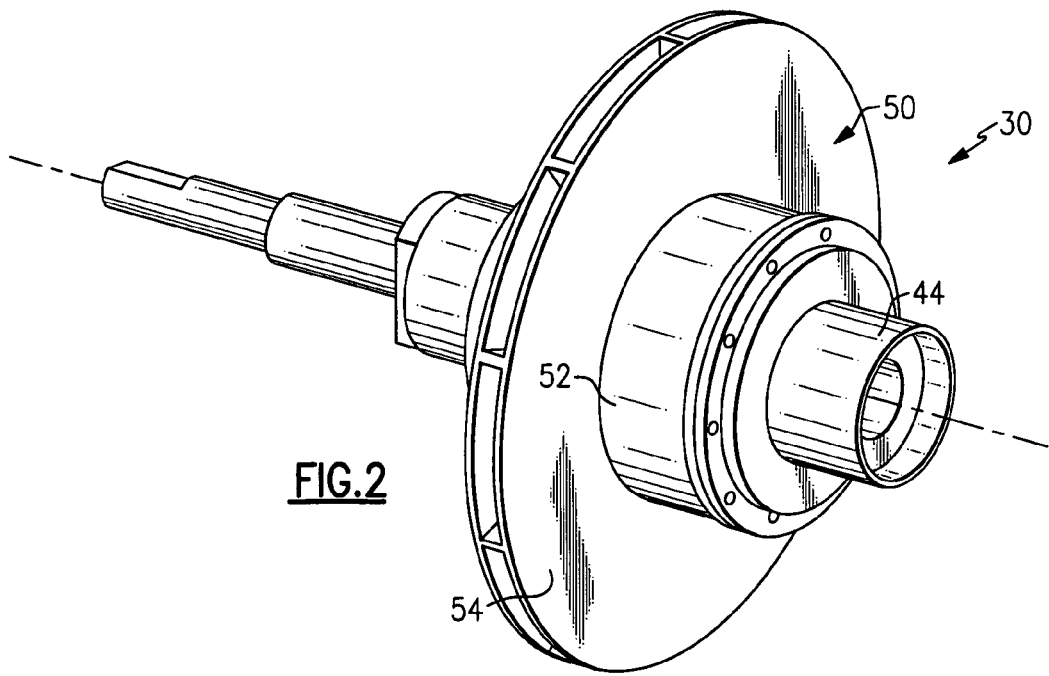

The rotary phase separator system 14 generally includes a rotary drum separator (RDS) 16 and a motor assembly 18. The motor assembly 18 drives the RDS 16 through a rotating assembly 20 (FIG. 2) in response to a controller 22 (illustrated schematically).

The RDS preferably operates at two operation speeds. A low speed is used for separating and accumulating water from gas. A higher speed is used for pumping the water once the accumulator is full. It should be understood that other two-phase reduction systems will also benefit from the RDS 16 designed according to the present invention. The rotary phase separator system 14 provide for separation of methane gas and liquid water phases at about 10 psia, and pumping of the liquid to a water bus pressure of up to 18 psia. The rotary phase separator system 14 achieves this pumping at less than 100 Watts, and separation at less than 25 Watts.

Figure 3A:
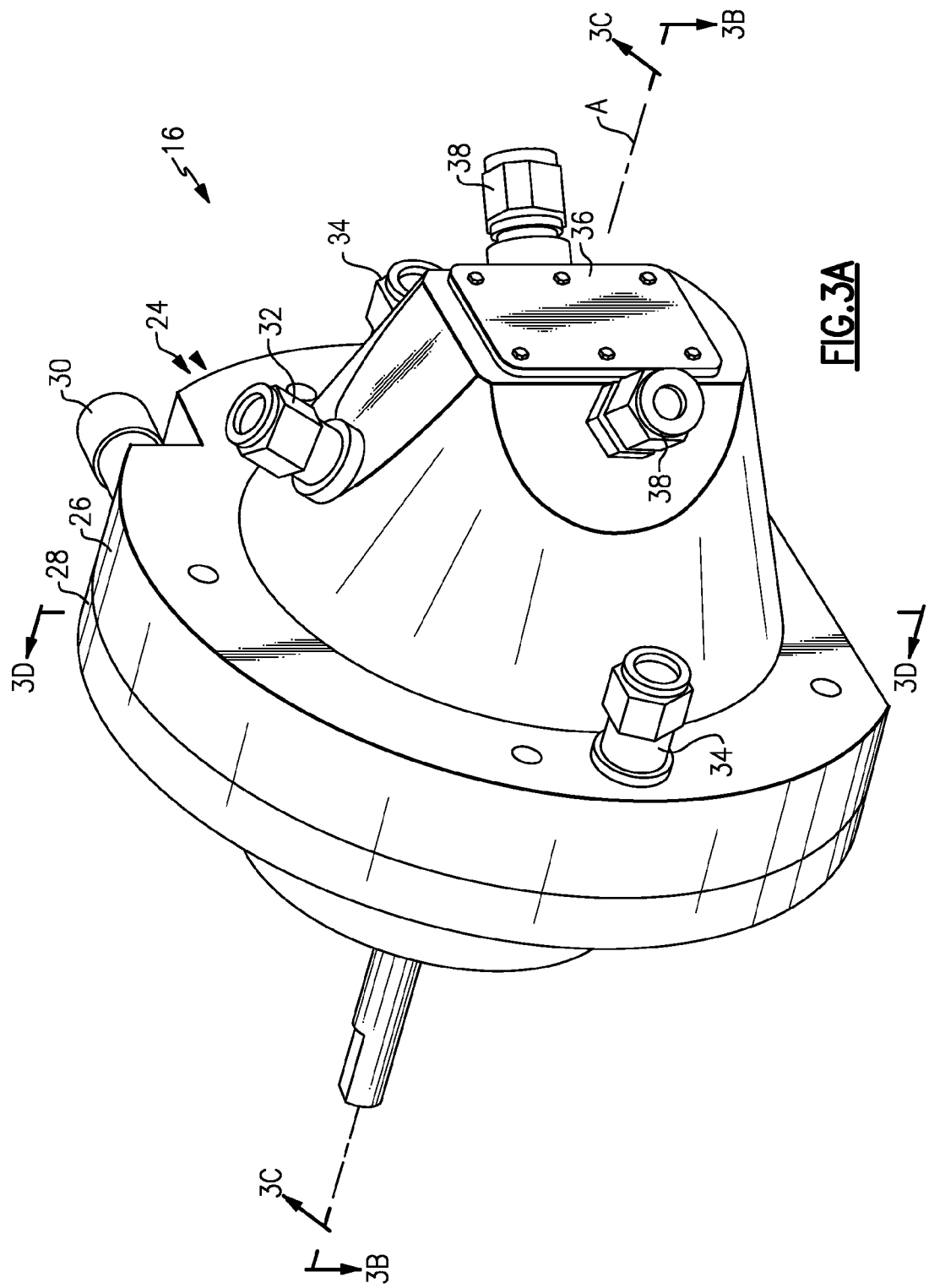

Referring to FIG. 3A, the RDS 16 includes a housing assembly 24 within which the rotating assembly 20 (FIG. 2) rotates about an axis of rotation A. Preferably, the housing assembly 24 includes a first housing portion 26 and a second housing portion 28 which encloses the rotating assembly 20 and provide passageways for fluid circulation. A water outlet tangential port tap 30 is tangential to the housing outer diameter and as such collects the water at maximum velocity head. A pressure port 32 provides for identification of a fill level. A radial port 34 normal to the rotating assembly 20 rotation serves as a static pressure port. A gas outlet port 36 is located along the RDS 16 centerline A and a two-phase inlet port 38 are located adjacent thereto. It should be understood that although only particular taps are described, any multiple of taps may be utilized with the present invention. It should be understood that taps 32T, 34T, 36T may be respectively located in the housing assembly 24 to provide communication with the respective ports 32, 34, 36. That is, the taps 32T, 34T, 36T provide connections with the housing assembly 24 and porting defined therein. Preferably, the internal volume of the separator will hold approximately 170 cc of water when full with a working volume of 70 cc mounted around the rotating assembly 20.

Figure 3B:
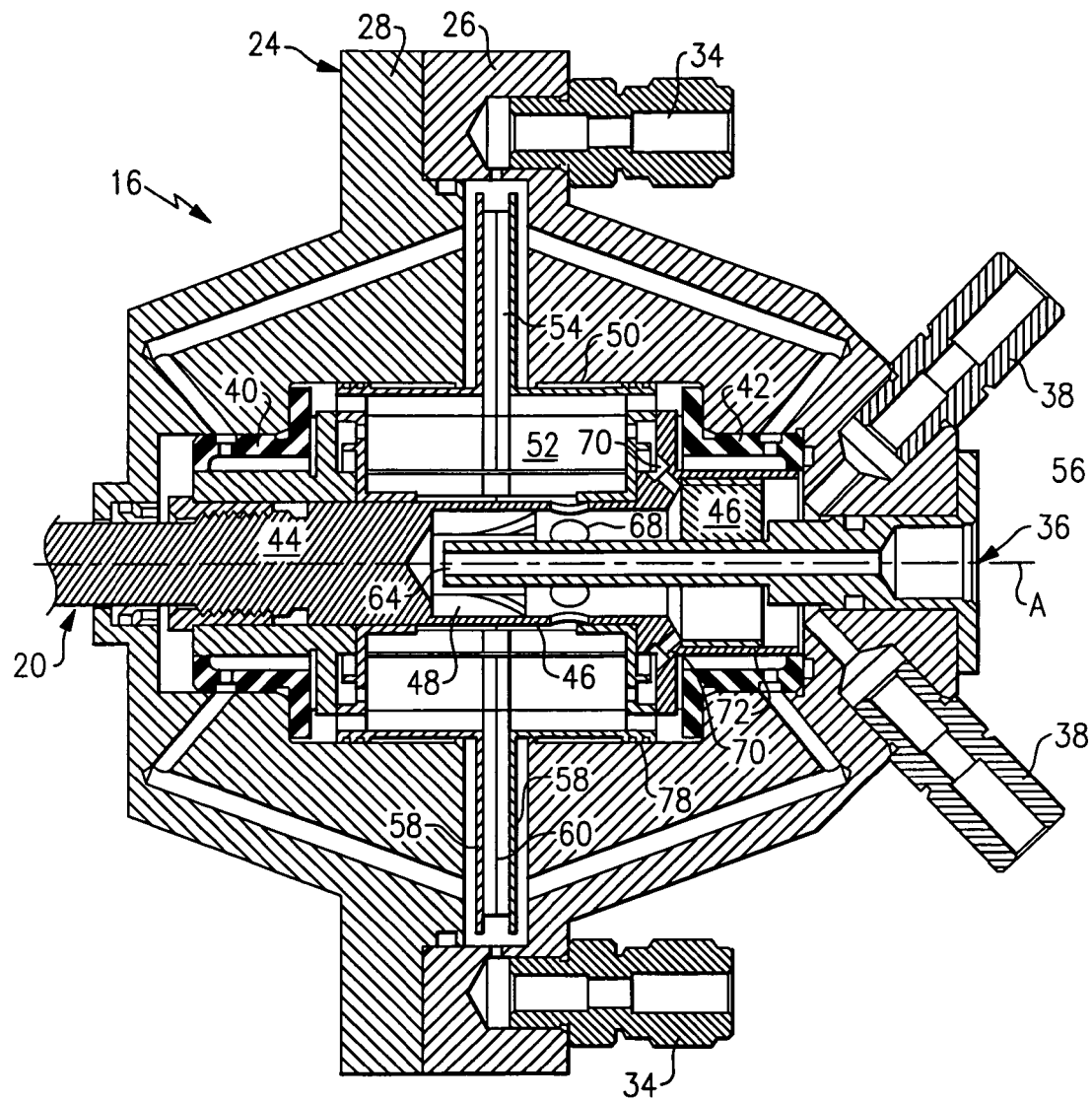

Referring to FIG. 3B, the rotating assembly 20 is mounted on a first and a second hydrodynamic bearing 40, 42 for rotation about the axis of rotation A. The bearings 40, 42 preferably provide both radial and thrust functions. The rotating assembly 20 includes a hollow shaft 44 which contains a primary separating impeller 46 and a secondary separating impeller 48. The motor provides leak free operation at sub-ambient pressure. The hollow shaft 44 contains a gas outlet tube 56 to the gas outlet port 36 located opposite the motor.

Figure 4:
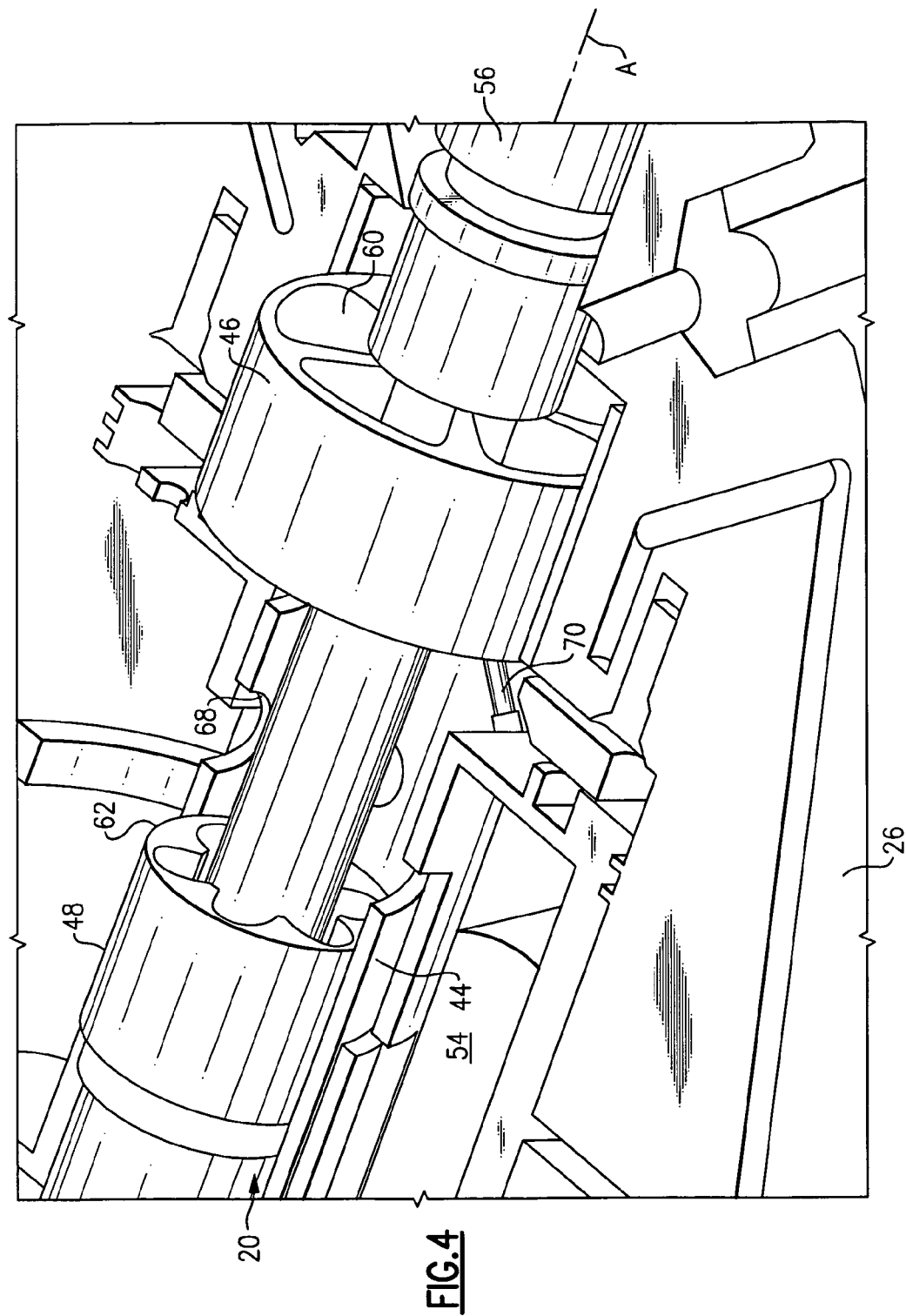
FIG. 4 is an expanded cut away perspective view of a shaft of the rotational assembly for a rotary drum separator of the present invention.

The primary separating impeller 46 includes internal vanes 60 (FIG. 4) that facilitate spinning of the two-phase liquid at shaft speed in order to develop the proper 'g' levels to drive the liquid radially outward while allowing the gas to remain adjacent the gas outlet tube 56.

The secondary separating impeller 48 inside the hollow shaft 44 facilitates separation capability and robustness. This secondary separating impeller 48 includes internal passages 62 (FIG. 4) that are drilled at an angle to the axis of rotation A to drive liquid (if present) away from an inlet 64 to the gas outlet tube 56 and radially outward. The secondary separating impeller 48 also serves as a way to clear away any liquid from near the inlet 64 that may result from a shut-down and restart situation.

The hollow shaft 44 supports a stepped drum 50 (also illustrated in FIGS. 2 and 3C) for accumulation and pumping. The stepped drum 50 is mounted on the shaft 44 that is supported by the hydrodynamic bearings 40, 42. The stepped drum 50 is stepped such that there is a smaller diameter accumulator section 52 and a relatively large diameter impeller pump section 54. The accumulator section 52 is utilized to provide the primary accumulator function. The impeller pump section 54 is utilized for the pumping function.

The aspect ratio of the stepped drum 50 is preferably sized to minimize power for both the accumulating and pumping functions. The accumulator section 52 has a relatively small diameter to minimize power losses and uses axial length to accomplish volume for accumulation. The impeller pump section 54 of the drum has a larger diameter in order to achieve pumping head but has a small axial length in order to minimize power losses.

Figure 3C:
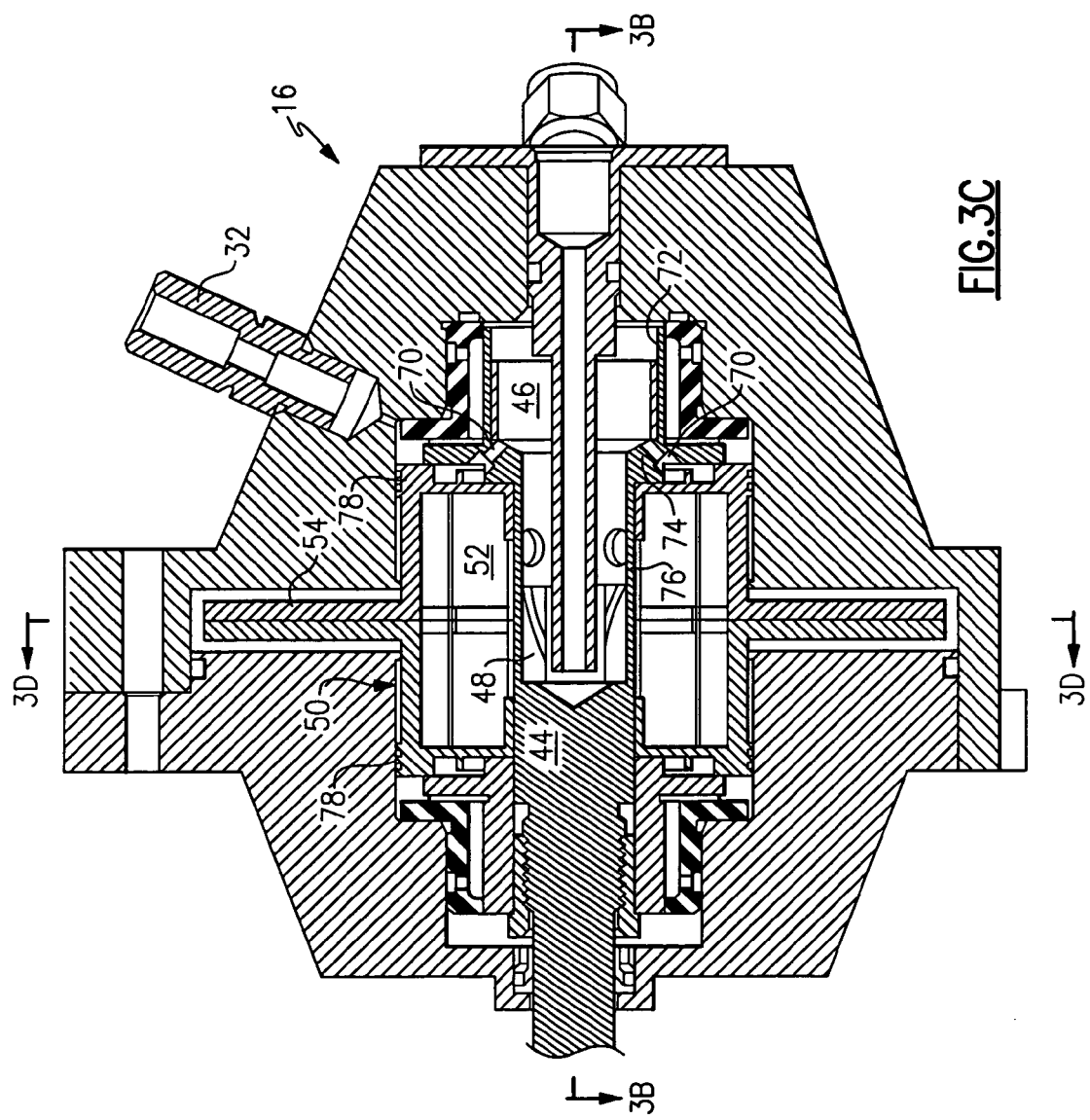
Figure 3D:
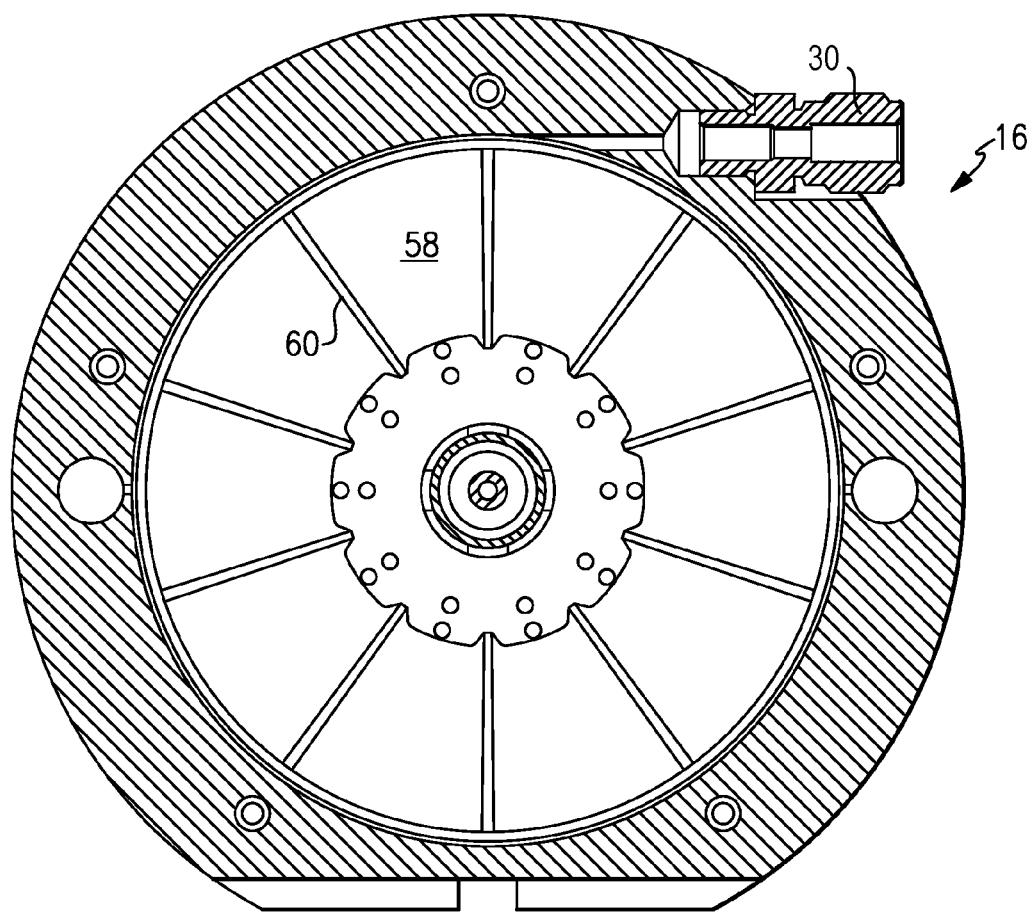

The impeller pump section 54 includes impeller disks 58 each having internal vanes 60 that facilitate the pumping function (also illustrated in FIG. 3D). The stepped drum 50 is preferably manufactured from two identical "half" drums assembled opposite to each other which readily facilitates manufacture (FIG. 3C). Preferably, the stepped drum 50 includes smooth exterior walls on the stepped drum 50 to minimize power losses. Smooth rotating walls of the stepped drums adjacent to smooth stationary walls formed tin the housing assembly 24 typically exhibit less drag than non-smooth geometry thereby minimizing the power required to rotate the rotational assembly 20.

Preferably, a labyrinth type geometry seal 78 is located on outer diameter of the accumulator section 52 of stepped drum 50 to minimize the flow of a recirculation loop from high-pressure side of the pump (at the largest diameter) to the inlet side of the pump. It should be understood that various seal arrangements may be used with the present invention.

Figure 5:
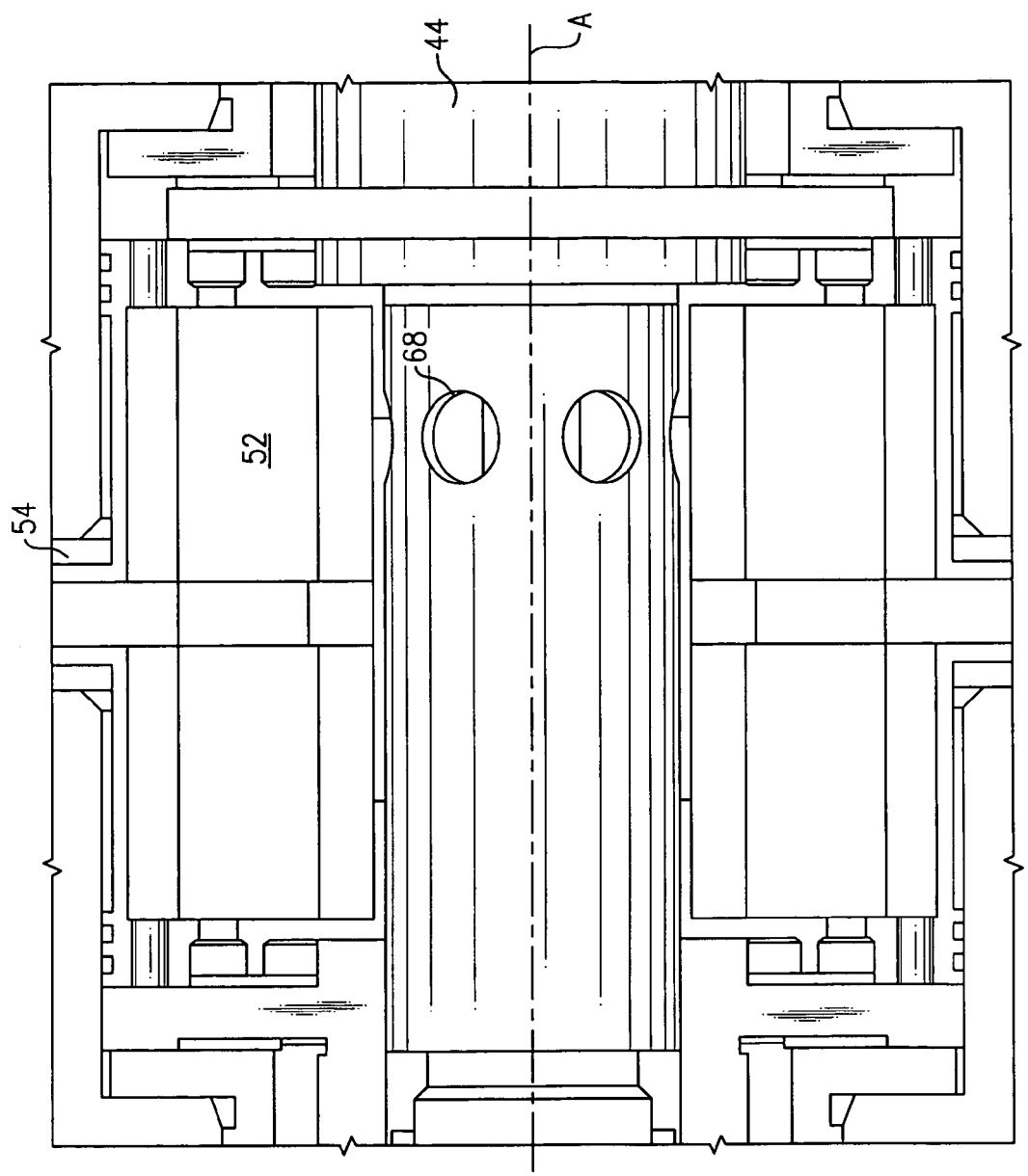
FIG. 5 is an expanded perspective view of the shaft of the rotational assembly for a rotary drum separator of the present invention.

The hollow shaft 44 includes a multitude of shaft gas communication apertures 68 (also illustrated in FIGS. 4 and 5) in communication with the accumulator section 52 and the impeller pump section 54. A multitude of liquid communication ports 70 (also illustrated in FIG. 4) are located adjacent an outer diameter of an impeller shaft section 72 which contains the primary separating impeller 46. The liquid communication ports 70 provide communication between the primary separating impeller 46 and the accumulator section 52. Preferably, the liquid communication ports 70 are circumferentially located and angled outward relative axis A about the hollow shaft 44 adjacent a junction 74 between the impeller shaft section 72 and a central shaft section 76.

In operation, the two-phase flow (water in mostly gas stream) input into the impeller shaft section 72 of the hollow shaft through the two-phase inlet port 38. The two-phase flow is centrifugally flung to the outer diameter of the impeller shaft section 72 that moves the water radially outward through the liquid communication ports 70 while allowing the gas to communicate into the central shaft section 76. The primary separating impeller 46 provides ample flow area for the gas while maintaining relatively small clearance to the central shaft section 76 and thence to the inlet 64 of the gas outlet tube 56 to avoid liquid carryover. The secondary separating impeller 48 facilitates separation capability and robustness to further minimize liquid (if present) entry into the inlet 64 of the gas outlet tube 56.

The accumulating function is effectuated inside the accumulator section 52 and the impeller pump section 54 that create a stepped annulus around the center hollow shaft 44. The water rotates at essentially shaft speed since it is fully enclosed by the accumulator section 52 and the impeller pump section 54 and has virtually no exposure to stationary housing walls. The "full" level is at the OD of the hollow shaft 44. The "empty" level of the accumulator will be at the OD of the accumulator section 52. The smooth outside walls of the stepped drum 50 minimize power losses. A minimized diameter to length ratio also minimizes power losses. Notably, as the accumulator section 52 and the impeller pump section 54 fill with liquid, gases therein (if present) are forced toward the axis of rotation A and back into the hollow shaft 44 through the shaft gas communication apertures 68 and thence into the into the inlet 64 of the gas outlet tube 56.

The pumping function is accomplished by the impeller pump section 54 which is facilitated by the internal vanes 60 between the impeller disks 58. Once the accumulator section 52 is "full," the liquid is pumped through the tangential outlet port 30 located at the maximum diameter of the impeller pump section 54 to maximize both static and dynamic head.

Figure 6:
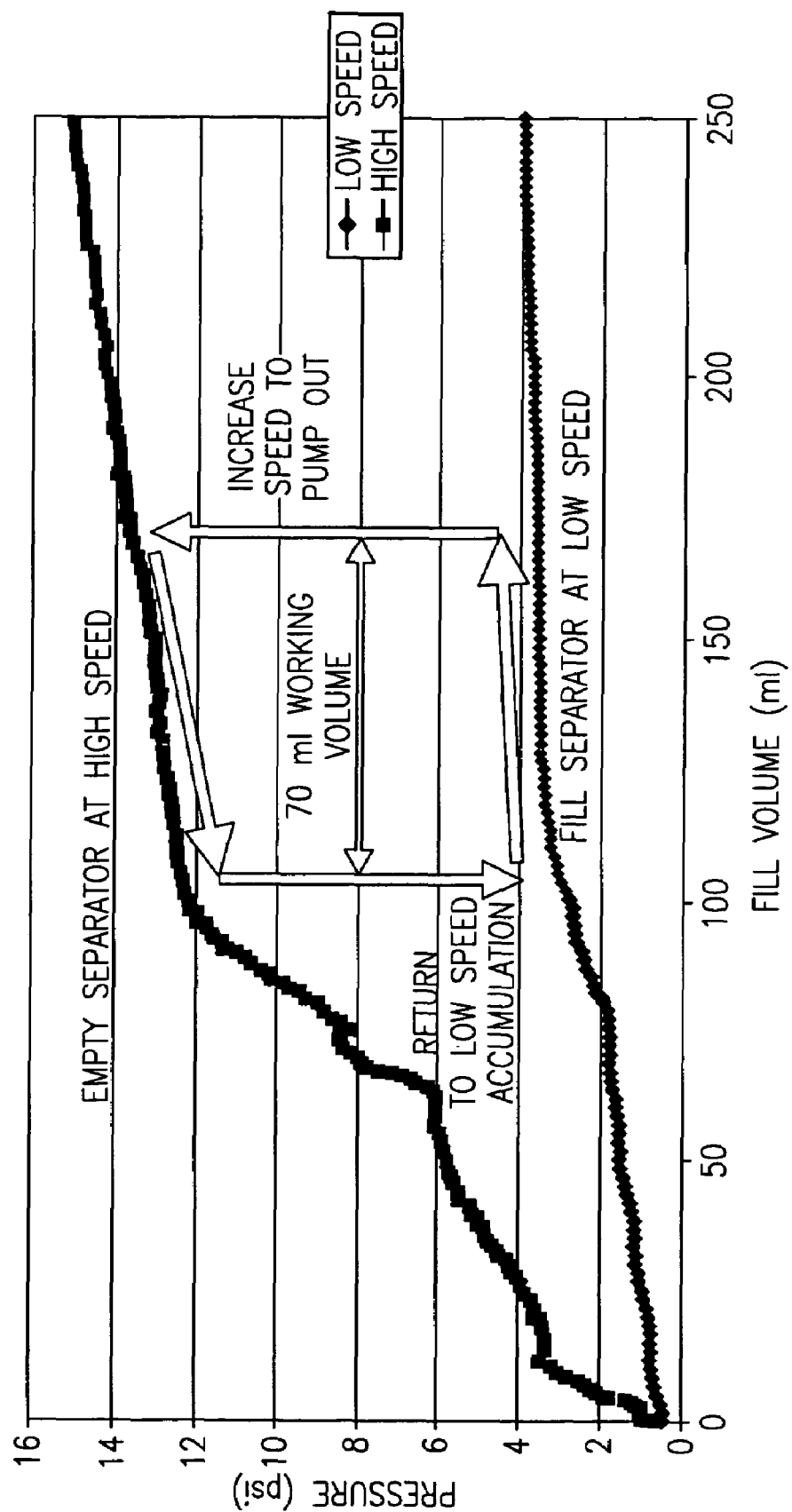
FIG. 6 is a graphical representation of an operating map for the rotary drum separator of the present invention.

Preferably, the RDS 16 operates on a two-speed schedule. At low speed, about 1000 rpm, the RDS 16 creates enough of an artificial gravity field to effectively separate the gas and liquid phases. The gas outlet port 36 is open when the Sabatier is in process mode generating water; therefore the vent gases flow through the RDS 16 with very little pressure drop. Pressure port 32, the gas outlet port tap 36 and the radial port 34 (FIG. 3) at the drum outer diameter allow monitoring of the liquid level via differential pressure. Applicant has calibrated the pressure vs. volume has in both 1-g and 0-g environments. Once the liquid level reaches the high end of the operating range ("full"), the controller (FIG. 1) increases the speed of the RDS 16 to about 2000 rpm. At this speed, the pressure generated by the centrifugal and velocity forces in the impeller shaft section 72 of the rotating assembly 20 is sufficient to overcome the system backpressure and the liquid empties from the RDS 16. The high speed condition is maintained for a sufficient length of time such that the liquid level drops to the low end of the operating range as generally illustrated in the graphical representation of FIG. 6.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotating assembly for a rotary phase separator system comprising:
   a hollow shaft defined along an axis of rotation;
   an accumulator section mounted about said axis of rotation for rotation with said hollow shaft, said accumulator section defines a first diameter;
   an impeller pump section mounted about said axis of rotation for rotation with said hollow shaft, said impeller pump section defines a second diameter greater than said first diameter; and
   a primary separating impeller mounted within said hollow shaft for rotation therewith, said primary separating impeller in communication with said accumulator section.

2. The assembly as recited in claim 1, wherein said accumulator section is mounted about said hollow shaft and said impeller pump section is mounted about said accumulator section.

3. The assembly as recited in claim 1, wherein said accumulator section defines a first axial length and said impeller pump section defines a second axial length less than said first axial length.

4. The assembly as recited in claim 1, wherein said primary separating impeller is mounted within an impeller shaft section of said hollow shaft, said impeller shaft section in communication with a central shaft section of said hollow shaft, said central shaft section including a multiple of shaft gas communication apertures in communication with said accumulator section.

5. The assembly as recited in claim 4, further comprising a two-phase inlet in communication with said impeller shaft section.

6. The assembly as recited in claim 1, further comprising a gas outlet tube mounted within said hollow shaft, said gas outlet tube in communication with a gas outlet port defined along said axis of rotation.

7. The assembly as recited in claim 6, wherein said gas outlet tube includes an inlet mounted opposite said gas outlet port along said axis of rotation.

8. The assembly as recited in claim 7, further comprising a secondary separating impeller mounted within said hollow shaft for rotation therewith, said secondary separating impeller mounted adjacent said inlet to said gas outlet tube.

9. A rotating assembly for a rotary phase separator system comprising:
   a hollow shaft defined along an axis of rotation;
   an accumulator section mounted about said axis of rotation for rotation with said hollow shaft, said accumulator section defines a first diameter; and
   an impeller pump section mounted about said axis of rotation for rotation with said hollow shaft, said impeller pump section defines a second diameter greater than said first diameter, wherein said impeller pump section includes an impeller disc and a multitude of impeller blades mounted to said impeller disc in a radial arrangement about said axis of rotation.

10. The assembly as recited in claim 9, further comprising a liquid outlet port tangential to said impeller pump section.

11. A rotary phase separator system comprising:
a housing;
a hydrodynamic bearing mounted within said housing;
a rotating assembly mounted to said hydrodynamic bearing for rotation within said housing, said rotating assembly comprising:
a hollow shaft defined along an axis of rotation;
a primary separating impeller mounted within an impeller shaft section of said hollow shaft for rotation therewith;
a gas outlet tube mounted within said hollow shaft;
an accumulator section mounted about said axis of rotation for rotation with said hollow shaft, said accumulator section defines a first diameter; and
an impeller pump section mounted about said axis of rotation for rotation with said hollow shaft, said impeller pump section defines a second diameter greater than said first diameter;
a two-phase input port within said housing, said two-phase input port in communication with said impeller shaft section; and
a gas outlet port within said housing along said axis of rotation, said gas outlet port in communication with said gas outlet tube.

12. The system as recited in claim 11, wherein said impeller pump section radially extends from said accumulator section, said impeller pump section includes an impeller disc and a multitude of impeller blades mounted to said impeller disc in a radial arrangement about said axis of rotation to define a stepped drum.

13. The system as recited in claim 12, further comprising an outlet port within said housing tangential to said impeller pump section.

14. The system as recited in claim 11, further comprising:
a motor mounted to said hollow shaft; and
a controller in communication with said motor to drive said hollow shaft at a multitude of speeds, said multiple of speeds include an accumulating speed and a pumping speed.

* * * * *

UNITED STATES PATENT AND TRADEMARK OFFICE
CERTIFICATE OF CORRECTION

PATENT NO. : 7,628,836 B2 Page 1 of 1
APPLICATION NO. : 11/429859
DATED : December 8, 2009
INVENTOR(S) : Barone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this

Twenty-first Day of December, 2010

David J. Kappos
*Director of the United States Patent and Trademark Office*